(12) United States Patent
Lee et al.

(10) Patent No.: US 8,541,938 B2
(45) Date of Patent: Sep. 24, 2013

(54) ELECTRONIC PAPER DISPLAY DEVICE AND METHOD OF MANUFACTURING THE SAME

(75) Inventors: Sang Moon Lee, Seoul (KR); Young Woo Lee, Gyunggi-do (KR); Choong Hee Lee, Gyunggi-do (KR); Sang Jin Kim, Gyunggi-do (KR); Hwan-Soo Lee, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 291 days.

(21) Appl. No.: 13/153,917

(22) Filed: Jun. 6, 2011

(65) Prior Publication Data

US 2012/0139408 A1    Jun. 7, 2012

(30) Foreign Application Priority Data

Dec. 7, 2010   (KR) ........................ 10-2010-0124468

(51) Int. Cl.
*H01J 1/62* (2006.01)
(52) U.S. Cl.
USPC .............. 313/483; 313/110; 313/113; 455/24
(58) Field of Classification Search
USPC ............................ 313/483, 110, 113; 445/24
See application file for complete search history.

(56) References Cited

U.S. PATENT DOCUMENTS

| | | | |
|---|---|---|---|
| 4,143,103 A | 3/1979 | Sheridon | |
| 5,262,098 A | 11/1993 | Crowley et al. | |
| 5,389,945 A | 2/1995 | Sheridon | |
| 5,717,515 A | 2/1998 | Sheridon | |
| 6,846,377 B2 | 1/2005 | Biegelsen et al. | |
| 2002/0185216 A1 | 12/2002 | Biegelsen et al. | |
| 2010/0321346 A1* | 12/2010 | Chae et al. | 345/204 |
| 2011/0069001 A1* | 3/2011 | Lee et al. | 345/107 |
| 2011/0254427 A1* | 10/2011 | Lee et al. | 313/113 |
| 2011/0298786 A1* | 12/2011 | Cho et al. | 345/214 |
| 2012/0069424 A1* | 3/2012 | Lee et al. | 359/296 |
| 2012/0069426 A1* | 3/2012 | Lee et al. | 359/296 |
| 2012/0170106 A1* | 7/2012 | Lee et al. | 359/296 |
| 2012/0300285 A1* | 11/2012 | Ra | 359/296 |

FOREIGN PATENT DOCUMENTS

| | | |
|---|---|---|
| JP | 2002148663 A | 5/2002 |
| JP | 2008-089820 A | 4/2008 |
| KR | 100703552 B1 | 3/2007 |
| KR | 20080010560 A | 1/2008 |
| KR | 20100099577 A | 9/2010 |

OTHER PUBLICATIONS

Korean Office Action corresponding to KR 10-2010-0124468 dated Jan. 19, 2012.

* cited by examiner

*Primary Examiner* — Mary Ellen Bowman
(74) *Attorney, Agent, or Firm* — Lowe, Hauptman & Ham

(57) ABSTRACT

There are provided an electronic paper display device and a method of manufacturing the same. The electronic paper display device includes: a lower substrate having lower barrier ribs formed thereon, the lower barrier ribs forming cells for receiving electronic paper display elements; electronic paper display elements mounted in the cells of the lower substrate and having optical and electrical anisotropy; and an upper substrate formed to cover the lower substrate and including upper patterns bonded to the lower barrier ribs so as to secure a fluid moving path of the cell.

15 Claims, 3 Drawing Sheets

ELECTRONIC PAPER DISPLAY DEVICE AND METHOD OF MANUFACTURING THE SAME

CROSS-REFERENCE TO RELATED APPLICATIONS

This application claims the priority of Korean Patent Application No. 10-2010-0124468 filed on Dec. 7, 2010, in the Korean Intellectual Property Office, the disclosure of which is incorporated herein by reference.

BACKGROUND OF THE INVENTION

1. Field of the Invention

The present invention relates to an electronic paper display device and a method of manufacturing the same, and more particularly, to an electronic paper display device including a barrier rib in which the roughness of the barrier rib having a twist ball mounted therein is uniform, and in which drag force applied during a rotation of an electronic paper display element is substantially reduced, and a method of manufacturing the same.

2. Description of the Related Art

In accordance with the recent development of a portable information terminal, an information communication network, or the like, demand for the development of a device having excellent portability and easy handling characteristics has increased. As a display device satisfying this demand, an "electronic paper display device" has been prevalent.

The "electronic paper display device" may have the flexibility required to provide the desired excellent portability and easy handling characteristics, may continuously provide clear image quality even after power is cut off, and may provide a high resolution and a wide viewing angle.

As a technical method of implementing an "electronic paper display element", there are mainly a method using a liquid crystal, an electroluminescence (EL) display, a reflective film reflection type display, an electrophoretic display, an electrochromic display, and the like.

Recently, in a scheme of using electrophoretic type capsules or twist balls as the electronic paper display element configuring the electronic paper display device, research into a method of optimizing a roughness and a structure of cells having the twist balls mounted therein in order to secure the uniformity and reliability of the rotational characteristics of the twist balls has been conducted.

Particularly, in the case of the cell, research into a method of securing the uniformity of the roughness thereof by physical processing such as laser processing or sandblasting and research into a method of substantially reducing drag force applied to the twist ball mounted in an inner portion of the cell have been conducted.

SUMMARY OF THE INVENTION

An aspect of the present invention provides an electronic paper display device including a cell having a structure in which the roughness of an inner portion of the cell having an electronic paper display element mounted therein is uniform and in which drag force applied thereto is substantially reduced during a rotation of a twist ball.

Another aspect of the present invention provides a method of manufacturing an electronic paper display device including a cell having a structure having uniform roughness in an inner portion of the cell having an electronic paper display element mounted therein and substantially reducing drag force applied thereto during a rotation of a twist ball.

According to an aspect of the present invention, there is provided an electronic paper display device including: a lower substrate having lower barrier ribs formed thereon, the lower barrier ribs forming cells for receiving electronic paper display elements; electronic paper display elements mounted in the cells of the lower substrate and having optical and electrical anisotropy; and an upper substrate formed to cover the lower substrate and including upper patterns bonded to the lower barrier ribs so as to secure a fluid moving path of the cell.

The cell formed by the lower barrier rib may have a shape in which upper and lower portions thereof are symmetrical.

The cell formed by the lower barrier rib may have a polygonal cross section or a circular cross section.

A height of the lower barrier rib may be higher than that of the electronic paper display element.

A height of the upper pattern may be 10 to 20 μm.

The upper pattern may have a cross shape or a linear shape.

The electronic paper display device may further include a fluid inlet formed, at an edge of the upper substrate or the lower substrate, wherein the fluid inlet connecting the cell to an external environment.

A height of the fluid inlet may be 5 to 20 μm.

The upper pattern and the lower barrier rib may be made of a transparent exposure material.

Each of the upper substrate and the lower substrate may be provided with an arrangement mark for arranging the cells and bonding the cells to each other.

According to another aspect of the present invention, there is provided a method of manufacturing an electronic paper display device, the method including: forming barrier ribs configuring cells on a lower substrate using an exposure method, the lower substrate having a first exposure material layer formed thereon; forming upper patterns on an upper substrate using the exposure method, the upper patterns having a fluid moving path formed therebetween and the upper substrate having a second exposure material layer formed thereon; and mounting electronic paper display elements on the lower substrate and bonding the upper substrate thereto.

The method may further include forming a fluid inlet at the upper substrate or the lower substrate, wherein the fluid inlet has fluid introduced from, the outside thereinto.

The cell formed by the lower barrier rib may have a polygonal cross section or a circular cross section.

A height of the lower barrier rib may be higher than that of the electronic paper display element.

The method may further include arranging positions of the upper pattern and the lower barrier rib using an arrangement mark formed in the upper substrate and the lower substrate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
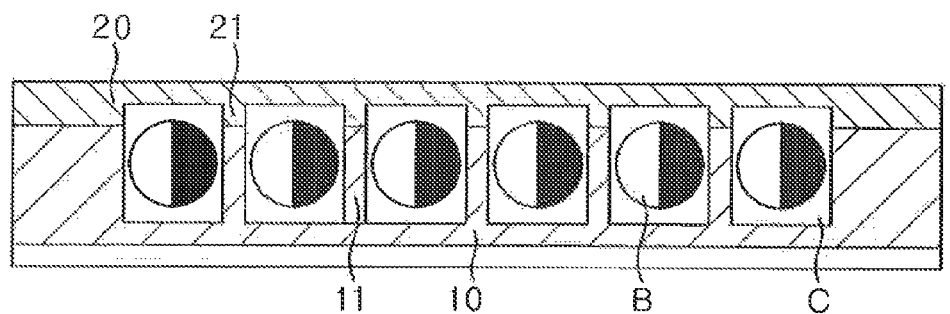
FIG. 1 is a cross-sectional view of an electronic paper display device according to an exemplary embodiment of the present invention.

Hereinafter, exemplary embodiments will be described in detail with reference to the accompanying drawings so that, they can be easily practiced by those skilled in the art to which the present invention pertains. However, in describing the exemplary embodiments of the present invention, detailed descriptions of well-known functions or constructions are omitted so as not to obscure the description of the present invention with unnecessary detail.

In addition, like reference numerals denote parts performing similar functions and actions throughout the drawings.

In addition, unless explicitly described otherwise, "comprising" any components will be understood to imply the inclusion of other components but not the exclusion of any other components.

Figure 2:
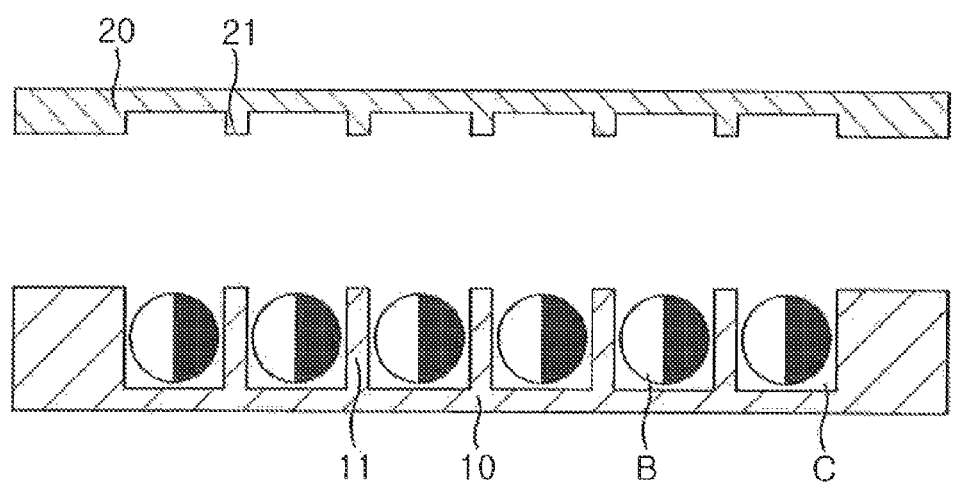
FIG. 2 is a cross-sectional view showing cross sections of an upper substrate and a lower substrate in an electronic paper display device according to an exemplary embodiment of the present invention.

FIG. 1 is a cross-sectional view of an electronic paper display device according to an exemplary embodiment of the present invention; and FIG. 2 is a cross-sectional view showing cross sections of an upper substrate and a lower substrate in an electronic paper display device according to an exemplary embodiment of the present invention. FIG. 3 ft is a plan view of an electronic paper display device according to an exemplary embodiment of the present invention; and FIG. 3B is a plan view of an electronic paper display device according to another exemplary embodiment of the present invention. FIG. 4 is an exploded perspective view showing a cell of an electronic paper display device according to an exemplary embodiment of the present invention.

FIG. 1 is a cross-sectional view schematically showing an electronic paper display device according so an exemplary embodiment of the present invention.

An electronic paper display device according to an exemplary embodiment of the present invention is configured to include a lower substrate 10, an upper substrate 20, and electronic paper display elements B mounted in cells C provided between the lower substrate 10 and the upper substrate 20.

The lower substrate 10 according to the exemplary embodiment of the present, invention may include lower barrier ribs 11 formed thereon to partition the cell C into cells in which the electronic paper display elements B are mounted.

The cell C may be formed to have a polygonal cross section such as a rectangular cross section or a circular cross section; however, a shape of the cross section of the cell C is not limited thereto. The cells C may be manufactured to have various shapes in which the electronic paper display elements B are mounted.

The electronic paper display element B is provided to have electrical, and optical anisotropy and is mounted in the cell C. The electronic paper display element B rotates by a voltage difference between electrodes formed on the upper-substrate and the lower substrate due to the electrical an isotropy.

The lower barrier rib 11 and an upper pattern 21 may be formed of an exposure material. The lower barrier rib 11 and an upper pattern 21 may be made of an exposure material such, as at least one selected from a SU-8 photoresist, a JSR photoresist, and a DRF photoresist; however, the exposure material is not limited thereto.

The lower barrier rib 11 and the upper pattern 21 may be formed by partially etching the exposure material by an exposure method without performing physical processing such as laser processing, sandblasting.

According to an exemplary embodiment of the present invention, since the lower barrier rib and the upper pattern are formed by the exposure method, which is a chemical method, rather than a physical method, the cell may be formed to have low and uniform roughness.

Therefore, drag force applied to the electronic paper display element B rotating in an inner portion of the cell C formed by the lower barrier rib and the upper pattern may be reduced. That is, friction between the electronic paper display element B and a surface with which the electronic paper display element B rotating in the inner portion of the cell C is in contact may be reduced, whereby the drag force applied to the electronic paper display element B may be reduced.

The electronic paper display element B rotates in the inner portion of the cell C, such that a friction force thereof is generated, A friction coefficient of the friction force is as follows:

$$f = -[1-(d/D)^3]^{-1}$$

where f indicates a friction coefficient applied to the electronic paper display element B, d indicates a diameter of the electronic paper display element, and D indicates a diameter of the cell C having the electronic paper display element mounted therein.

The drag force applied to the electronic paper display element B has a value in proportion to the friction coefficient. It may be confirmed that when the electronic paper display element B rotates, the smaller d is, that is, the smaller the diameter of the electronic paper display element B is, the smaller the drag force is, and the larger D is, that is, the larger the diameter of the cell C having the electronic paper display element B mounted therein is, the smaller the drag force is.

Therefore, it may be appreciated that when the diameter of the cell C is smaller toward a lower portion thereof, the drag force applied to the electronic paper display element B is larger toward the lower portion thereof. In other words, when the cell C has an asymmetrical shape, the drag force also becomes asymmetrical, thereby having a negative influence on rotational characteristics of the electronic paper display element B rotating in the inner portion of the cell C.

The cell C formed, by the lower barrier rib 11 according to an exemplary embodiment of the present invention may have a structure in which upper and lower portions thereof are symmetrical.

The cell C may be formed to have a polygonal cross section or a circular cross section. A phenomenon in which the drag force applied to the electronic paper display element B is increased toward the lower portion of the cell, due to fluid received together with the electronic paper display element in the inner portion of the cell C according to the related art and due to a structure of the cell C of which a shape is narrower toward the lower portion thereof according to the related art, may be prevented.

According to an exemplary embodiment of the present invention, the lower barrier rib 11 may be formed to be higher than a height of the electronic paper display element B mounted in the cell C.

According to the related art, when a height of the cell C is the same as or lower than that of the electronic paper display element B, the drag force applied to the cell is non-uniform to deteriorate the rotational characteristics of the cell. When the height of the cell C is lower than that of the electronic paper display element B, the drag force is not applied to an upper portion of the electronic paper display element B, which corresponds to a portion higher than a height of the cell C; however, the drag force is applied to a lower portion of the electronic paper display element B, which corresponds to a portion lower than height of the cell C, thereby causing deterioration of the rotational characteristics of the cell due to a relative drag force difference.

According to an exemplary embodiment of the present invention, the lower barrier rib 11 is formed to have a height higher than, that of the electronic paper display element B, such that the drag forces having a uniform magnitude are applied to the upper and lower portions of the cell, whereby the rotational characteristics of the electronic paper display element B may be improved.

Therefore, according to an exemplary embodiment of the present invention, the cell C formed by the lower barrier rib 11 has a shape in which the upper and lower portions thereof are symmetrical, and has a height higher than that of the electronic paper display element B, whereby occurrence of a difference in the drag forces applied to the upper and lower portions of the cell may be prevented. Accordingly, when the electronic paper display element B rotates in the inner portion of the cell, the uniform drag force is applied thereto to improve the rotational characteristics of the electronic paper display element B.

In addition, the cell may have an asymmetrical shape in the case in which an upper open portion of a rotating bail does not have an influence therefrom; however, the shape of the cell is not limited thereto. This is the reason that particularly, when the cell has the asymmetrical shape in which the upper portion thereof does not have an influence on the open portion, the shape does not have an influence on a display area.

The upper substrate 20 according to an exemplary embodiment of the present invention is provided with the upper pattern 21 formed thereon. The upper pattern 21 may be formed to be connected to other cells C through a fluid moving path unlike the barrier rib structure.

That is, the upper pattern 21 according to an exemplary embodiment of the present invention may be formed to be bonded to a portion of the lower barrier rib 11, wherein a portion bonded to the lower barrier rib 11 may form a barrier rib of the cell; and a portion not bonded to the lower barrier rib 11, that is, a portion at which the upper pattern is not formed on the upper substrate, or a portion at which a height of the upper pattern 21 is lower than those of other upper patterns, may forms an opening when the upper pattern 21 is bonded to the lower barrier rib 11.

Particularly, the opening may be used as the fluid moving path through which fluid is injected into the inner portion of the cell C formed by the upper substrate 20 and the lower substrate 10 after the upper substrate 20 is bonded to the lower substrate 10.

In addition, to this end, the electronic paper display device according to an exemplary embodiment of the present invention may further include a fluid inlet 30 formed at the upper substrate 20 or the lower substrate 10, the fluid inlet 30 introducing fluid thereinto or discharging the fluid to the outside.

The upper pattern may be formed to have a cross shape or a linear shape; however, she shape of the upper pattern is not limited thereto. The upper pattern may have various shapes, and may be bonded to the lower barrier rib 11 to form the fluid moving path; however, the shape of the upper pattern is not limited thereto.

Meanwhile, referring to FIG. 1, the cell C formed in the electronic paper display device according to an exemplary embodiment of the present invention has a polygonal cross section or a circular cross section of the upper substrate 20 and the lower substrate 10, such that the drag force having the uniform magnitude may be applied to an upper surface and a lower surface of the cell, as compared, to a cell having an opened shape according to the related art and also the fluid may be simply introduced into the inner portion of the cell or may be simply discharged to the outside through the fluid moving path.

FIG. 2 is an exploded cross-sectional view of an electronic paper display device according to an exemplary embodiment of the present invention.

A method of manufacturing an electronic paper display device according to an exemplary embodiment of the present invention having a structure in which the upper and lower portions of the cell are symmetrical will be described.

The method of manufacturing an electronic paper display device according to the exemplary embodiment of the present invention may include forming barrier ribs configuring cells on a lower substrate using an exposure method, the lower substrate having a first exposure material layer formed thereon, forming upper patterns on an upper substrate using the exposure method, the upper patterns having a fluid moving path formed therein and the upper substrate being provided as a second exposure material layer formed thereon, and mounting electronic paper display elements on the lower substrate and bonding the upper substrate thereto.

According to an exemplary embodiment of the present invention, the barrier ribs configuring the cells are formed by the exposure method on the lower substrate on which the first exposure material layer is formed. Then, the upper patterns are formed on the upper substrate using the exposure method, the upper pattern, having the fluid moving path formed therein and the upper substrate having the second exposure material layer formed thereon.

According to an exemplary embodiment of the present invention, a first exposure material composing the first exposure material layer and a second exposure material composing the second exposure material layer may be at least one selected from a group consisting of a SU-8 photoresist, a JSR photoresist, and a DRF photoresist.

The exposure layer is formed on the substrate, and an ultraviolet ray is irradiated thereto or heat is applied thereto, whereby a lower barrier rib or an upper pattern having a desired shape may be formed.

According to an exemplary embodiment of the present invention, since the upper pattern is particularly made of a transparent exposure material, optical loss in the electronic paper display device may be reduced, and the upper and lower subs orates may be arranged and may be then bonded by being irradiated with the UV or applied with the heat.

In forming the upper substrate and the lower substrate, the upper substrate may be first formed or the lower substrate may be first formed. According to an exemplary embodiment of the present invention, after the respective substrates are formed, the electronic paper display element is mounted on the lower substrate and the upper substrate is bonded to the lower substrate, thereby obtaining the electronic paper display device. In bonding the upper substrate to the lower substrate, the substrates may be arranged, through an arrangement mark and be then bonded to each other.

In addition, the method of manufacturing an electronic paper display device according to an exemplary embodiment of the present invention may further comprise a fluid inlet 30 formed as the upper substrate or the lower substrate, the fluid inlet 30 introducing the fluid, from the outside thereinto or discharging the fluid to the outside.

In the electronic paper display device according to an exemplary embodiment of the present invention, each of the upper and lower substrates may include the arrange mark. In order to allow the upper pattern to accurately coincide with the lower barrier rib in bonding the upper substrate to the lower substrate, the upper and lower substrates may be arranged through the arrangement mark.

In the case of the electronic paper display device formed according to an exemplary embodiment of the present invention, the barrier rib or the pattern may be formed by an exposure method using exposure material, which is a chemical etching method, rather than using a physical process such as a laser process, a sandblast process, whereby rise in roughness on the surface of the pattern or the barrier rib may be prevented. Furthermore, the exposure method is used, whereby the roughness may be uniform over the substrate.

Therefore, according to an exemplary embodiment of the present invention, since the roughness of the cell may be uniform, the drag force of the cell may be reduced, such that the rotational characteristics of the cell may be improved.

According to an exemplary embodiment of the present invention, since the exposure method is used, a degree of freedom in design is increased, as compared to a method of forming a barrier rib or a pattern through physical etching according to the related art, whereby the cells having various shapes may be formed.

That is, the cell C having optimal rotational characteristics may be manufactured by analysing interaction between a width of the barrier rib or the pattern, an oil viscosity, and a response speed. In addition, the exposure method is used, whereby the cell C may be manufactured to have the uniform roughness and width. Therefore, a flexible electronic paper may be easily manufactured.

Figure 3A:
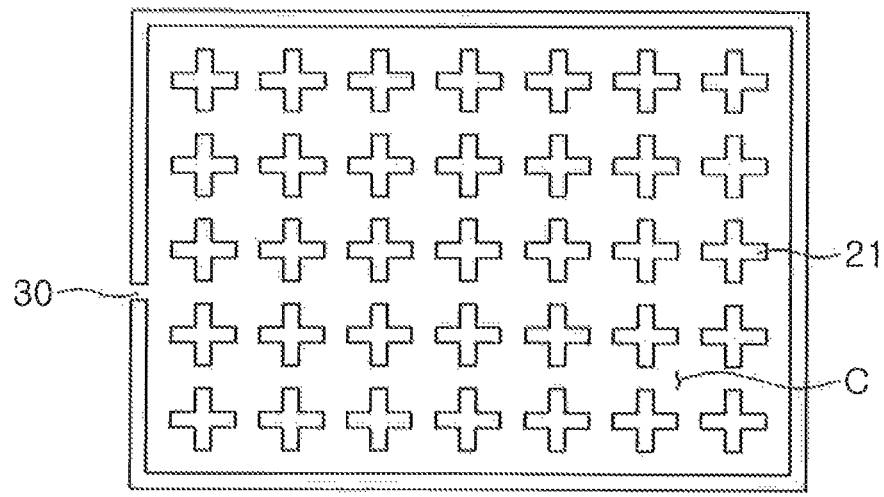
FIG. 3A is a plan view of son electronic paper display device according to an exemplary embodiment of the present invention.
Figure 3B:
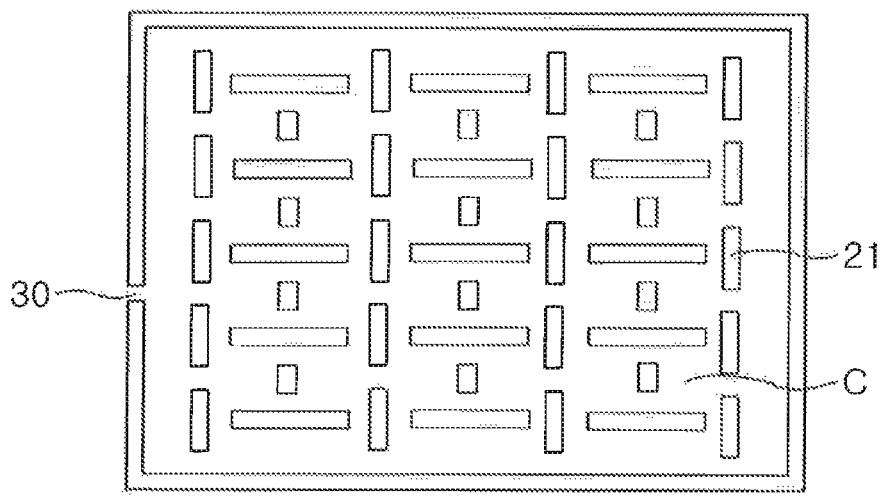
FIG. 3B is a plan view of an electronic paper display device according to another exemplary embodiment of the present invention.
Figure 4:
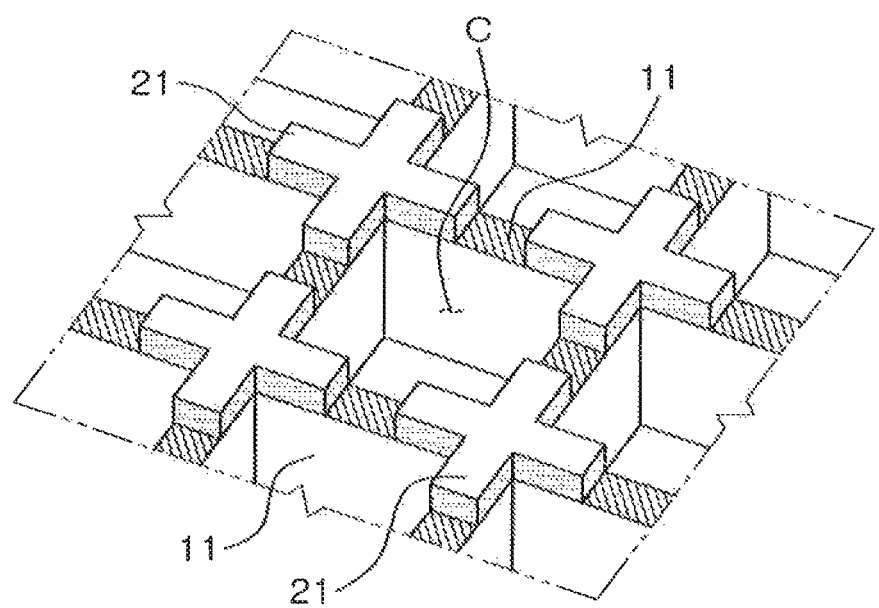
FIG. 4 is an exploded perspective view showing a cell of an electronic paper display device according to an exemplary embodiment of the present invention.

FIG. 3A shows an upper pattern according to an exemplary embodiment of the present invention; and FIG. 3B shows an upper pattern according to another exemplary embodiment of the present invention.

FIG. 3A shows a cross shaped upper pattern, and FIG. 3B shows a linear upper pattern. The upper pattern according to the exemplary embodiment of the present invention may be formed to secure a fluid moving path between the cells; however, the upper pattern is not limited thereto but may have various shapes.

According to an exemplary embodiment of the present invention, the upper pattern may be formed to secure the fluid moving path between the cells, wherein the fluid moving path has a height of 5 to 20 μm.

Meanwhile, the upper pattern according to the exemplary embodiment of the present invention may be manufactured, to have a height of 10 to 20 μm. The fluid moving path in the upper pattern may be formed by allowing the height of the upper pattern to be lower than those of other patterns or may be formed by not partially forming the upper pattern.

In other words, according to an exemplary embodiment of the present invention, the height of the fluid moving path may be the same as or lower than that of she upper pattern. When the height of the fluid moving path is higher than that of the upper pattern, a process for securing the fluid moving path in the lower barrier rib should be separately performed, and the uniform drag force may also not be provided in the rotation of the electronic paper display element B mounted in the cell C. Therefore, the height of the fluid moving path may be the same as or lower than that of the upper pattern in order to substantially reduce an influence on the electronic paper display element B.

FIG. 4 is a partially enlarged view showing a shape in which the cross shaped upper pattern 21 is bonded to the lower barrier rib 11 according to an embodiment of the present invention.

According to the exemplary embodiment of the present invention, a cubic cell C may be formed by the lower barrier rib 11, and the upper pattern 21 may be boned onto the lower barrier rib 11.

Since the upper patterns 21 have the fluid moving path formed therebetween, fluid may move between the cells, may be introduced from the outside thereinto, and may be discharged, to the outside, through the fluid moving path.

In the case of the electronic paper display device according to an exemplary embodiment of the present invention, a symmetrical cell C having a cubic shape is formed, whereby the electronic paper display element may have the uniform rotational characteristics. In addition, the drag force applied to the electronic paper display element may be uniformized or optimised, thereby improving the reliability of the electronic paper display device during long-term driving.

According to an exemplary embodiment of the present invention, the exposure method is used, whereby the rotational characteristics of the electronic paper display element may be controlled according to the width of the barrier rob and the oil viscosity. That is, the exposure method, is used, whereby an optimal cell C structure may be formed by analysing the interaction between the cell size, the oil viscosity, and the response speed.

Therefore, according to an exemplary embodiment of the present invention, the electronic paper display device capable of substantially reducing and uniformizing the roughness of the cell and substantially reducing the drag force applied to the electronic paper display element, and the method of manufacturing the same may be provided.

As set forth above, according to the exemplary embodiments of the present invention, the electronic paper display device capable of securing the uniformity and the reliability of the rotational characteristics of the electronic paper display element by uniformizing the roughness of the inner portion of the cell having the electronic paper display element mounted therein and substantially reducing the drag force applied thereto during the rotation of the electronic paper display element, and the method of manufacturing the same are provided.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic paper display device comprising:
   a lower substrate having lower barrier ribs formed thereon forming cells for receiving electronic paper display elements;
   electronic paper display elements mounted in the cells of the lower substrate and having optical and electrical anisotropy; and
   an upper substrate formed to cover the lower substrate and including upper patterns bonded to the lower barrier ribs so as to secure a fluid moving path of the cell.

2. The electronic paper display device of claim 1, wherein a cell formed by the lower barrier ribs has a shape in which upper and lower portions thereof are symmetrical.

3. The electronic paper display device of claim 2, wherein the cell formed by the lower barrier rib has a polygonal cross section or a circular cross section.

4. The electronic paper display device of claim 1, wherein a height of the lower barrier rib is higher than that of the electronic paper display element.

5. The electronic paper display device of claim 1, wherein a height of the upper pattern is 10 to 20 μm.

6. The electronic paper display device of claim 1, wherein the upper pattern has a shape of a straight line or a cross.

7. The electronic paper display device of claim 1, wherein the upper substrate or the lower substrate has a fluid inlet formed at an edge thereof, the fluid inlet connecting the cell to an external environment.

8. The electronic paper display device of claim 7, wherein a height of the fluid inlet is 5 to 20 µm.

9. The electronic paper display device of claim 1, wherein the upper pattern and the lower barrier rib are made of a transparent exposure material.

10. The electronic paper display device of claim 1, wherein each of the upper substrate and the lower substrate further includes an arrangement mark for arranging the cells and bonding the cells to each other.

11. A method of manufacturing an electronic paper display device, the method comprising:
    forming lower barrier ribs configuring cells on a lower substrate using an exposure method, the lower substrate having a first exposure material layer formed thereon;
    forming upper patterns on an upper substrate using the exposure method, the upper patterns capable of securing a fluid moving path and the upper substrate having a second exposure material layer formed thereon; and
    mounting the electronic paper display elements on the lower substrate and bonding the upper substrate thereto.

12. The method of claim 11, further comprising forming a fluid inlet at the upper substrate or the lower substrate, wherein the fluid inlet has fluid introduced from the outside thereinto.

13. The method of claim 11, wherein the cell formed by the lower barrier rib has a polygonal or a circular cross section.

14. The method of claim 11, wherein a height of the lower barrier rib is higher than that of the electronic paper display element.

15. The method of claim 11, wherein positions of the upper pattern and the lower barrier rib are arranged using an arrangement mark formed in the upper substrate and the lower substrate.

\* \* \* \* \*